(12) United States Patent
Chesser et al.

(10) Patent No.: US 7,439,209 B2
(45) Date of Patent: *Oct. 21, 2008

(54) DRILLING FLUID SYSTEMS WITH IMPROVED FLUID LOSS PROPERTIES

(75) Inventors: Billy G. Chesser, Coldsprings, TX (US); Charles Perricone, Montgomery, TX (US); George W. Bettge, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 944 days.

This patent is subject to a terminal disclaimer.

(21) Appl. No.: 10/136,522

(22) Filed: May 1, 2002

(65) Prior Publication Data

US 2004/0072695 A1 Apr. 15, 2004

Related U.S. Application Data

(63) Continuation-in-part of application No. 09/435,386, filed on Nov. 5, 1999, now Pat. No. 6,403,537.

(51) Int. Cl.
*C09K 8/12* (2006.01)
(52) U.S. Cl. .................. 507/120; 507/121; 507/906
(58) Field of Classification Search .............. 507/120, 507/121, 906
See application file for complete search history.

(56) References Cited

U.S. PATENT DOCUMENTS

| | | | |
|---|---|---|---|
| 3,210,310 A | 10/1965 | Holbert et al. | |
| 3,562,226 A | 2/1971 | Gayley et al. | |
| 3,826,311 A | 7/1974 | Szabo et al. | |
| 4,366,074 A | 12/1982 | McLaughlin et al. | |
| 4,395,524 A | 7/1983 | Emmons et al. | |
| 4,409,110 A | 10/1983 | Borchardt et al. | |
| 4,425,241 A | 1/1984 | Swanson | |
| 4,480,702 A | 11/1984 | Kelly, Jr. | |
| 4,517,333 A | 5/1985 | Lundberg et al. | |
| 4,532,052 A | 7/1985 | Weaver et al. | |
| 4,540,496 A | 9/1985 | Peiffer et al. | |
| 4,547,299 A | 10/1985 | Lucas | |
| 4,552,670 A | 11/1985 | Lipowski et al. | |
| 4,554,081 A | 11/1985 | Borchardt et al. | |
| 4,600,515 A | 7/1986 | Gleason et al. | |
| 4,626,363 A | 12/1986 | Gleason et al. | |
| 4,649,183 A | 3/1987 | McCormick et al. | |
| H385 H | 12/1987 | Bol | |
| 4,812,242 A | 3/1989 | James et al. | |
| 4,861,499 A | 8/1989 | Neff et al. | |
| 4,892,916 A | 1/1990 | Hawe et al. | |
| 4,970,260 A | 11/1990 | Lundberg et al. | |
| 5,116,421 A | 5/1992 | Ganguli | |
| 5,134,118 A | 7/1992 | Patel et al. | |
| 5,570,749 A | 11/1996 | Reed | |
| 5,607,902 A | 3/1997 | Smith et al. | |
| 5,620,947 A | 4/1997 | Elward-Berry | |
| 5,663,123 A | 9/1997 | Goodhue, Jr. et al. | |
| 5,735,349 A | 4/1998 | Dawson et al. | |
| 5,762,141 A | 6/1998 | Hutchins et al. | |
| 5,789,349 A | 8/1998 | Patel | |
| 6,172,010 B1 | 1/2001 | Argillier et al. | |
| 6,355,600 B1 * | 3/2002 | Norfleet et al. | 507/120 |
| 6,403,537 B1 * | 6/2002 | Chesser et al. | 507/120 |
| 6,855,671 B2 * | 2/2005 | Norfleet et al. | 507/120 |

FOREIGN PATENT DOCUMENTS

| | | |
|---|---|---|
| EP | 0 544 377 A1 | 6/1993 |
| EP | 0 728 826 A1 | 8/1996 |
| WO | WO 89/09091 | 10/1989 |
| WO | WO 90/14403 | 11/1990 |
| WO | WO 00/27944 | 5/2000 |

OTHER PUBLICATIONS

Borchardt, J.K., "Oil Field Applications," Encyclopedia of Polymer Science and Engineering, 1987, vol. 10, pp. 328-396, John Wiley & Sons, NY, USA, XP002129993.
Fritz Industries, Inc., "Material Safety Data Sheet", Oct, 23, 1998, pp. 1-2.
USPTO, First Office Action for U.S. Appl. No. 09/435,386, Jan. 31, 2001.
The Morris Law Firm, P.C., Response to First Office Action for U.S. Appl. No. 09/435,386, Mar. 26, 2001.
USPTO, Final Office Action for U.S. Appl. No. 09/435,386, Jun. 19, 2001.
The Morris Law Firm, P.C., Response to Final Office Action for U.S. Appl. No. 09/435,386, Jul. 12, 2001.
PCT IPEA, PCT Written Opinion for PCT/US99/26135. Sep. 1, 2000.
UK Patent Office, Examination Report for UK Patent Application No. 0113647.2, May 15, 2002.
Frank B. Dehn & Co., Response to UK Examination Report mailed May 15, 2002 for UK Patent Application No. 0113647.2, Nov. 15, 2002.
UK Patent Office, Examination Report for UK Patent Application No. 0113647.2, Nov. 22, 2002.
Frank B. Dehn & Co., Response to UK Examination Report mailed Nov. 22, 2002 for UK Patent Application No. 0113647.2, Feb. 5, 2003.

* cited by examiner

*Primary Examiner*—Melvin C Mayes
(74) *Attorney, Agent, or Firm*—Paula D. Morris; The Morris Law Firm, P.C.

(57) ABSTRACT

A drilling fluid system comprising a brine and a quantity of cationic copolymers comprising a ratio of acrylamide monomers to cationic derivatives of acrylamide monomers, wherein the quantity and the ratio are effective to maintain effective rheology and fluid loss control in said drilling fluid system at temperatures of at least about 250° C. for at least about 16 hours.

122 Claims, No Drawings

DRILLING FLUID SYSTEMS WITH IMPROVED FLUID LOSS PROPERTIES

CROSS REFERENCE TO RELATED APPLICATIONS

The present application is a continuation-in-part of patent application Ser. No. 09/435,386, issued as U.S. Pat. No. 6,403,537 on Jun. 11, 2002, which claims the benefit of Provisional Application No. 60/107,487 filed Nov. 6, 1998 (expired).

FIELD OF THE APPLICATION

The present application relates to brine based drilling fluid systems with improved fluid loss control properties at high temperatures provided by cationic polymers.

BACKGROUND

Filtration control is one of the most important properties of a drilling fluid, particularly when drilling through permeable formations where the hydrostatic pressure exceeds the formation pressure. It is important for a drilling fluid to quickly form a filter cake which effectively minimizes fluid loss, but which also is thin and dispersible enough to allow product to flow into the wellbore during production.

Filtration control additives for brines typically are nonionic water soluble polymers, such as starches, derivatized starches, gums, derivatized gums, and cellulosics. These polymers have certain advantages, but suffer from the disadvantage that they have a relatively low hydration rate in brines—particularly in high density brines, where very little water actually is available to hydrate and swell the polymers.

Another disadvantage of nonionic water-soluble polymers is that they have limited temperature stability. As wells are drilled deeper, higher bottomhole temperatures are encountered. Today's drilling fluids need to maintain stable rheology and low filtration at temperatures above 300° F. Unfortunately, the nonionic water soluble polymers currently in use are not stable at temperatures exceeding about 225° F. with extended aging times.

Filtration control additives are needed which will quickly form a thin, dispersible filter cake, and which also have high temperature stability for prolonged periods of time.

BRIEF SUMMARY

The present application provides a drilling fluid system comprising:
a brine comprising an amount of at least one bridging agent and a quantity of cationic copolymer comprising a first ratio of acrylamide monomers to cationic derivatives of acrylamide monomers comprising

wherein
x is from about 1 to about 3;
$R^1$ is selected from the group consisting of hydrogen and alkyl groups having from about 1 to about 3 carbon atoms; and $R^2$, $R^3$, and $R^4$ are selected from the group consisting of hydrogen; cyclic, linear, and branched alkyl and heteroalkyl groups having from about 1 to about 6 carbon atoms wherein said heteroalkyl groups comprise one or more heteroatoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear and branched alkyl groups, heteroalkyl groups, alkenyl groups, and heteroalkenyl groups having from about 1 to about 6 carbon atoms wherein said hetero groups comprise one or more heteroatoms selected from the group consisting of nitrogen and oxygen; aromatic groups; alkanols and alkenols having from about 1 to about 6 carbon atoms; alkanolamides and alkenol amides having from about 1 to about 6 carbon atoms; and combinations thereof;
wherein said quantity of said cationic polymer and said amount of said bridging agent are effective to form a filter cake which provides effective filtration control and rheology in said drilling fluid system at temperatures of at least about 250° F. for at least about 16 hours.

DETAILED DESCRIPTION

The present application provides a drilling fluid system, preferably for use as a drill-in or completion fluid, which quickly forms a thin, dispersable filter cake and which is stable for prolonged periods of time at high temperatures.

The drilling fluid system comprises an aqueous brine, preferably a "high density brine" (defined below), a viscosifier, a bridging agent, a pH stabilizer, and one or more fluid loss control additive(s). A preferred fluid loss control additive comprises cationic copolymers.

The cationic copolymers of the present application may be used as an additive in substantially any aqueous brine drilling fluid system. However, not all types of drilling fluid systems encounter extremely high temperatures. Because of this, a preferred use for the drilling fluid system of the present application is as a drill-in or completion fluid—fluids which are more likely to be exposed to higher downhole temperatures for prolonged periods of time.

Preferred drill-in and completion fluids are brines having a density of at least about 9 lb/gal, most preferably "high density brines," defined herein to mean brines having a density of at least about 12-17 lb/gal. The brines may contain substantially any suitable salts, including, but not necessarily limited to salts based on metals, such as calcium, magnesium, sodium, potassium, cesium, zinc, aluminum, and lithium. Salts of calcium and zinc are preferred. The salts may contain substantially any anions, with preferred anions being less expensive anions including, but not necessarily limited to chlorides, bromides, formates, acetates, and nitrates. Most preferred salts are calcium bromide and zinc bromide.

For purposes of the present application, the term "cationic copolymers" is defined to refer to cationic copolymers which provide effective rheology and filtration control at temperatures greater than about 250° F., preferably about 300° F., most preferably about 325° F., for about 16 hours, preferably for about 48 hours or more. For purposes of the present application, effective rheology is defined to mean structure which is sufficient to suspend bridging agents but not excessive so as to cause high equivalent circulating densities. Effective filtration control is defined to mean control which provides a low filtration rate with a thin, dispersable filter cake.

Preferred cationic copolymers include, but are not necessarily limited to copolymers comprising, and preferably consisting essentially of monomers of acrylamide and monomers of a cationic derivative of acrylamide. A preferred cationic derivative of acrylamide for use in such copolymers is

wherein x is from about 1 to about 3;

$R^1$ is selected from the group consisting of hydrogen and alkyl groups having from about 1 to about 3 carbon atoms. $R^1$ may be substantially any substituent that does not interfere with the function of the polymer. In a preferred embodiment, $R^1$ is selected from the group consisting of hydrogen and a methyl group.

$R^2$, $R^3$, and $R^4$ independently are selected from the group consisting of hydrogen; cyclic, linear, and branched alkyl and heteroalkyl groups having from about 1 to about 6 carbon atoms wherein said heteroalkyl groups comprise one or more heteroatoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear and branched alkyl groups, heteroalkyl groups, alkenyl groups, and heteroalkenyl groups having from about 1 to about 6 carbon atoms wherein said hetero groups comprise one or more heteroatoms selected from the group consisting of nitrogen and oxygen; aromatic groups; alkanols and alkenols having from about 1 to about 6 carbon atoms; alkanolamides and alkenol amides having from about 1 to about 6 carbon atoms; and combinations thereof. The copolymers preferably comprise a ratio of from about 3:1 to about 1:1 of the cationic monomer. A preferred cationic derivative of acrylamide comprises at least two nitrogen atoms—a first nitrogen atom which comprises a part of the amide group, and a second quaternized nitrogen atom with a positive charge.

Cationic copolymers suitable for use in the present application are commercially available from Fritz Industries, Inc., Dallas, Tex., under the name EXP-8 EMULSION POLYMER. In order to achieve the desired Theological stability and filtration control, the fluid should contain from about 1 lb/bbl to about 10 lb/bbl of a 35% active solution of the cationic copolymer in a suitable carrier, such as oil, which translates to about 0.35 to about 3.5 lb/bbl active cationic copolymer.

The cationic copolymers can be used alone or used in conjunction with a different type of fluid loss additive, preferably a 2-amino-2-methyl propane sulfonic acid (AMPS) additive, such as KEM SEAL PLUS®, available from Baker Hughes INTEQ. Where a combination of cationic copolymer and another fluid loss additive is used, the ratio of cationic copolymer to the other fluid loss additive preferably is about 2:1 to about 1:2, most preferably about 1:1.

The system preferably includes bridging agents to bridge the pores in the formation. Suitable bridging agents include, but are not necessarily limited to ground marble or calcium carbonate particles, such as MIL-CARBO®, available from Baker Hughes INTEQ. Preferred calcium carbonate particles have a mean particle size of about 30 microns. Calcium carbonate has the advantage that it is acid soluble, and therefore can be removed from the formation by acid flushing. If calcium carbonate is used as the bridging agent, about 50 pounds should be used per barrel of brine.

The system also preferably includes a viscosifier, such as SALT WATER GEL®, available from Baker-Hughes INTEQ, Houston, Tex. A preferred viscosifier is EXP-77, a cellulosic blend, also available from Baker Hughes INTEQ.

Finally, the system includes a suitable material for adjusting the pH of the system to from about 9 to about 10. Suitable materials include, but are not necessarily limited to hydrous oxides of divalent cations. A preferred material is MgO.

A preferred basic formulation for a drilling fluid system according to the present application is given in the following table:

| Component/Product | Quantity |
| --- | --- |
| Brine (12-17 lb/gal density) | 38-39 gal |
| EXP-77 | 5-15 lb/bbl |
| MIL-CARB ® | 50 lb/bbl |
| MgO | 3-5 lb/bbl |
| Cationic Copolymer (35% active) | 1-10 lb/bbl |
| KEM SEAL PLUS ® | 0-4 lb/bbl |

The application will be more clearly understood with reference to the following examples, which are illustrative only and should not be construed as limiting the present application.

EXAMPLE I

Tests were conducted to determine fluid properties of two fluids having the following compositions:

| | CONCENTRATION (g) | |
| --- | --- | --- |
| COMPONENT | Fluid 1 | Fluid 2 |
| $CaCl_2/CaBr_2$ Brine (13.5 lb/gal density) | 510.5 | 508 |
| EXP-77 | 10 | 10 |
| MIL-CARB ® | 50 | 50 |
| MgO | 3 | 3 |
| Cationic Copolymer (35% active) | 5.7 | 5.7 |
| KEM SEAL PLUS ® | — | 2 |

In order to prepare the fluids, the brine was placed in a 1000 ml. beaker and a Silverson L4RT Mixer shaft with a small hole sleeve was inserted. The speed of the mixer was adjusted to 7000 rpm. The EXP-77 was added to the brine and the fluid was mixed for 5 minutes. The MIL-CARB® and MgO were added, and mixing was continued for 5 minutes at 5000 rpm. The cationic copolymer then was added, and the resulting fluid was mixed at 5000 rpm for another 5 minutes. Rheology tests were run immediately. The fluids exhibited the following properties:

| | Properties | | | |
|---|---|---|---|---|
| | Fluid 1 | | Fluid 2 | |
| Fann 35 @ 120° F. | Initial | After Hot Rolling 16 hr @ 325° F. | Initial | After Hot Rolling 16 hr @ 325° F. |
| Fann 600 rpm | 155 | 117 | 148 | 114 |
| Fann 300 rpm | 87.5 | 64 | 83.5 | 63 |
| Fann 200 rpm | 62.5 | 48.5 | 60 | 48 |
| Fann 100 rpm | 35 | 31.5 | 33.5 | 32 |
| Fann 6 rpm | 3.5 | 10 | 3 | 10.5 |
| Fann 3 rpm | 2.5 | 8.5 | 2.5 | 8.5 |
| pH (10% disp.) | 9.3 | 9.3 | 9.1 | 9.4 |
| API Fluid Loss, ml. | 0.0 | | 0.0 | |
| HTHP Fluid Loss, ml. × 2* | | 16.0 | | 10.0 |

*325° F., 500 psi, 0.5 hr, paper disc

Fluid loss values measured for both of the foregoing fluids were less than the values typically achievable using biopolymers. Because the fluid containing KEM-SEAL PLUS® achieved a fluid loss of only 10.0 ml., it was concluded that a preferred system is a combination of the cationic copolymer and KEMSEAL PLUS®.

EXAMPLE II

Tests were conducted on a fluid having the following composition to determine fluid properties:

| COMPONENT | CONCENTRATION (g) |
|---|---|
| CaCl$_2$/CaBr$_2$ Brine (13.5 lb/gal density) | 508 |
| EXP-77 | 10 |
| MIL-CARB ® | 50 |
| MgO | 3 |
| Cationic Copolymer (35% active) | 5.7 |
| KEM SEAL PLUS ® | 2 |

The fluid exhibited the following properties:

| | Properties | | |
|---|---|---|---|
| Fann 35 @ 120° F. | Initial | After Hot Rolling 16 hrs @ 325° F. | After Hot Rolling 48 hrs @ 325° F. |
| Fann 600 rpm | 148 | 114 | 98 |
| Fann 300 rpm | 83.5 | 63 | 62 |
| Fann 200 rpm | 60 | 48 | 47 |
| Fann 100 rpm | 33.5 | 32 | 32 |
| Fann 6 rpm | 3 | 10.5 | 10.5 |
| Fann 3 rpm | 2.5 | 8.5 | 9 |
| pH (10% disp.) | | 9.4 | 8.9 |
| API Fluid Loss, ml. | 0.0 | | |
| HTHP Fluid Loss, ml. × 2* | | 10.0 | 14.8 |

*325° F., 500 psi, 0.5 hr, paper disc

The combination of cationic copolymers with KEM SEAL PLUS® was tested after hot rolling for 16 hours, and after hot rolling for 48 hours. A 10.0 ml. fluid loss was obtained at 16 hours, increasing to 14.8 ml. after 48 hours. Both fluid loss values are better than those achievable using biopolymers as filtration control additives under similar conditions.

Many modifications and variations may be made to the embodiments described herein without departing from the spirit of the present application. The embodiments described herein are illustrative only should not be construed as limiting the scope of the present application.

We claim:

1. A drilling fluid system comprising:
a brine comprising an amount of at least one bridging agent and a quantity of cationic copolymer comprising a first ratio of cationic derivatives of acrylamide monomers to acrylamide monomers, said cationic derivatives of acrylamide monomers having the following general structure:

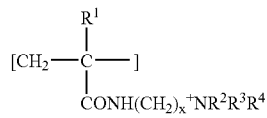

wherein
x is from about 1 to about 3;
R$^1$ is selected from the group consisting of hydrogen and alkyl groups having from about 1 to about 3 carbon atoms; and
R$^2$, R$^3$, and R4 are selected from the group consisting of hydrogen; cyclic, linear, and branched alkyl. and heteroalkyl groups having from about 1 to about 6 carbon atoms wherein said heteroalkyl groups comprise one or more heteroatoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear and branched alkyl groups, heteroalkyl groups, alkenyl groups, and heteroalkenyl groups having from about 1 to about 6 carbon atoms wherein said hetero groups comprise one or more heteroatoms selected from the group consisting of nitrogen and oxygen; aromatic groups; alkanols and alkenols having from about 1 to about 6 carbon atoms; alkanolamides and alkenol amides having from about 1 to about 6 carbon atoms; and combinations thereof;
wherein said quantity of said cationic copolymer and said amount of said bridging agent are effective to form a filter cake which provides effective filtration control and rheology in said drilling fluid system at temperatures of at least about 250° F. for at least about 16 hours.

2. The drilling fluid system of claim 1 wherein R$^2$, R$^3$, and R$^4$ are selected from the group consisting of hydrogen, cyclic, linear, and branched alkyl groups from about 1 to about 6 carbon atoms.

3. The drilling fluid system of claim 1 wherein R$^2$, R$^3$, and R$^4$ are linear alkyl groups from about 1 to about 6 carbon atoms.

4. The drilling fluid system of claim 1 wherein said first ratio is from about 3:1 to about 1:1.

5. The drilling fluid system of claim 2 wherein said first ratio is from about 3:1 to about 1:1.

6. The drilling fluid system of claim 3 wherein said first ratio is from about 3:1 to about 1:1.

7. The drilling fluid system of claim 2 wherein said brine comprises a density of about 9.0 lb/gal or greater.

8. The drilling fluid system of claim 3 wherein said brine comprises a density of about 9.0 lb/gal or greater.

9. The drilling fluid system of claim 4 wherein said brine comprises a density of about 9.0 lb/gal or greater.

10. The drilling fluid system of claim 5 wherein said brine comprises a density of about 9.0 lb/gal or greater.

11. The drilling fluid system of claim 6 wherein said brine comprises a density of about 9.0 lb/gal or greater.

12. The drilling fluid system of claim 1 wherein said brine further comprises a fluid loss control additive comprising 2-amino-2-methyl propane sulfonic acid.

13. The drilling fluid system of claim 7 wherein said brine further comprises a fluid loss control additive comprising 2-amino-2-methyl propane sulfonic acid.

14. The drilling fluid system of claim 8 wherein said brine further comprises a fluid loss control additive comprising 2-amino-2-methyl propane sulfonic acid.

15. The drilling fluid system of claim 9 wherein said brine further comprises a fluid loss control additive comprising 2-amino-2-methyl propane sulfonic acid.

16. The drilling fluid system of claim 10 wherein said brine further comprises a fluid loss control additive comprising 2-amino-2-methyl propane sulfonic acid.

17. The drilling fluid system of claim 11 wherein said brine further comprises a fluid loss control additive comprising 2-amino-2-methyl propane sulfonic acid.

18. The drilling fluid system of claim 12 wherein said brine further comprises a fluid loss control additive comprising 2-amino-2-methyl propane sulfonic acid.

19. The drilling fluid system of claim 14 wherein said cationic polymer and said fluid loss control additive are present in said drilling fluid system at a second ratio of from about 2:1 to about 1:2.

20. The drilling fluid system of claim 15 wherein said cationic polymer and said fluid loss control additive are present in said drilling fluid system at a second ratio of from about 2:1 to about 1:2.

21. The drilling fluid system of claim 16 wherein said cationic polymer and said fluid loss control additive are present in said drilling fluid system at a second ratio of from about 2:1 to about 1:2.

22. The drilling fluid system of claim 17 wherein said cationic polymer and said fluid loss control additive are present in said drilling fluid system at a second ratio of from about 2:1 to about 1:2.

23. The drilling fluid system of claim 18 wherein said cationic polymer and said fluid loss control additive are present in said drilling fluid system at a second ratio of from about 2:1 to about 1:2.

24. The drilling fluid system of claim 13 wherein said cationic polymer and said fluid loss control additive are present in said drilling fluid system at a second ratio of about 1:1.

25. The drilling fluid system of claim 14 wherein said cationic polymer and said fluid loss control additive are present in said drilling fluid system at a second ratio of about 1:1.

26. The drilling fluid system of claim 15 wherein said cationic polymer and said fluid loss control additive are present in said drilling fluid system at a second ratio of about 1:1.

27. The drilling fluid system of claim 16 wherein said cationic polymer and said fluid loss control additive are present in said drilling fluid system at a second ratio of about 1:1.

28. The drilling fluid system of claim 17 wherein said cationic polymer and said fluid loss control additive are present in said drilling fluid system at a second ratio of about 1:1.

29. The drilling fluid system of claim 18 wherein said cationic polymer and said fluid loss control additive are present in said drilling fluid system at a second ratio of about 1:1.

30. The drilling fluid system of claim 19 wherein said cationic polymer and said fluid loss control additive are present in said drilling fluid system at a second ratio of about 1:1.

31. The drilling fluid system of claim 1 wherein said brine has a density of from about 12 to about 17 lb/gal.

32. The drilling fluid system of claim 1 wherein said brine has a density of from about 12 to about 17 lb/gal.

33. The drilling fluid system of claim 3 wherein said brine has a density of from about 12 to about 17 lb/gal.

34. The drilling fluid system of claim 4 wherein said brine has a density of from about 12 to about 17 lb/gal.

35. The drilling fluid system of claim 5 wherein said brine has a density of from about 12 to about 17 lb/gal.

36. The drilling fluid system of claim 6 wherein said brine has a density of from about 12 to about 17 lb/gal.

37. The drilling fluid system of claim 13 wherein said brine has a density of from about 12 to about 17 lb/gal.

38. The drilling fluid system of claim 26 wherein said brine has a density of from about 12 to about 17 lb/gal.

39. A drilling fluid system comprising:
a brine comprising a viscosifier, a density of about 9 lb/gal or greater, an amount of at least one bridging agent, and a quantity of cationic copolymer comprising a first ratio of cationic derivatives of acrylamide monomers to acrylamide monomers, said cationic derivatives of acrylamide monomers having the following general structure:

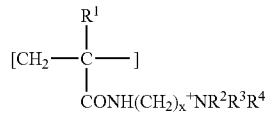

wherein
x is from about 1 to about 3;
$R^1$ is selected from the group consisting of hydrogen and alkyl groups having from about 1 to about 3 carbon atoms;
wherein $R^2$, $R^3$, and $R^4$ are selected from the group consisting of hydrogen; cyclic, linear, and branched alkyl and heteroalkyl groups having from about 1 to about 6 carbon atoms wherein said beteroalkyl groups comprise one or more hetero atoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear and branched alkyl groups, heteroalkyl groups, alkenyl groups, and heteroalkenyl groups baying from about 1 to about 6 carbon atoms wherein said hetero groups comprise one or more hetero atoms selected from the group consisting of nitrogen and oxygen; aromatic groups; alkanols and alkenols having from about 1 to about 6 carbon atoms; alkanolamides and alkenol amides having from about 1 to about 6 carbon atoms; and combinations thereof;
wherein said quantity of said cationic copolymer and said amount of said bridging agent are effective to form a filter cake which provides effective filtration control and rheology in said drilling fluid system at temperatures of at least about 250° F. for at least about 16 hours.

40. The drilling fluid system of claim 39 wherein $R^2$, $R^3$, and $R^4$ are selected from the group consisting of hydrogen, cyclic, linear, and branched alkyl groups from about 1 to about 6 carbon atoms.

41. The drilling fluid system of claim 39 wherein $R^2$, $R^3$, and $R^4$ are linear alkyl groups from about 1 to about 6 carbon atoms.

42. The drilling fluid system of claim 39 wherein said first ratio is from about 3:1 to about 1:1.

43. The drilling fluid system of claim 40 wherein said first ratio is from about 3:1 to about 1:1.

44. The drilling fluid system of claim 41 wherein said first ratio is from about 3:1 to about 1:1.

45. The drilling fluid system of claim 39 wherein said brine further comprises a fluid loss control additive comprising 2-amino-2-methyl propane sulfonic acid.

46. The drilling fluid system of claim 40 wherein said brine further comprises a fluid loss control additive comprising 2-amino-2-methyl propane sulfonic acid.

47. The drilling fluid system of claim 41 wherein said brine further comprises a fluid loss control additive comprising 2-amino-2-methyl propane sulfonic acid.

48. The drilling fluid system of claim 42 wherein said brine further comprises a fluid loss control additive comprising 2-amino-2-methyl propane sulfonic acid.

49. The drilling fluid system of claim 43 wherein said brine further comprises a fluid loss control additive comprising 2-amino-2-methyl propane sulfonic acid.

50. The drilling fluid system of claim 44 wherein said brine further comprises a fluid loss control additive comprising 2-amino-2-methyl propane sulfonic acid.

51. The drilling fluid system of claim 39 wherein said brine further comprises a fluid loss control additive, wherein said cationic polymer and said fluid loss control additive are present in said drilling fluid system at a second ratio of from about 2:1 to about 1:2.

52. The drilling fluid system of claim 42 wherein said brine further comprises a fluid loss control additive, wherein said cationic polymer and said fluid loss control additive are present in said drilling fluid system at a second ratio of from about 2:1 to about 1:2.

53. The drilling fluid system of claim 43 wherein said brine further comprises a fluid loss control additive, wherein said cationic polymer and said fluid loss control additive are present in said drilling fluid system at a second ratio of from about 2:1 to about 1:2.

54. The drilling fluid system of claim 44 wherein said brine further comprises a fluid loss control additive, wherein said cationic polymer and said fluid loss control additive are present in said drilling fluid system at a second ratio of from about 2:1 to about 1:2.

55. The drilling fluid system of claim 48 wherein said brine further comprises a fluid loss control additive, wherein said cationic polymer and said fluid loss control additive are present in said drilling fluid system at a second ratio of from about 2:1 to about 1:2.

56. The drilling fluid system of claim 49 wherein said brine further comprises a fluid loss control additive, wherein said cationic polymer and said fluid loss control additive are present in said drilling fluid system at a second ratio of from about 2:1 to about 1:2.

57. The drilling fluid system of claim 50 wherein said brine further comprises a fluid loss control additive, wherein said cationic polymer and said fluid loss control additive are present in said drilling fluid system at a second ratio of from about 2:1 to about 1:2.

58. The drilling fluid system of claim 39 wherein said brine further comprises a fluid loss control additive, wherein said cationic polymer and said fluid loss control additive are present in said drilling fluid system at a second ratio of about 1:1.

59. The drilling fluid system of claim 42 wherein said brine further comprises a fluid loss control additive, wherein said cationic polymer and said fluid loss control additive are present in said drilling fluid system at a second ratio of about 1:1.

60. The drilling fluid system of claim 43 wherein said brine further comprises a fluid loss control additive, wherein said cationic polymer and said fluid loss control additive are present in said drilling fluid system at a second ratio of about 1:1.

61. The drilling fluid system of claim 44 wherein said brine further comprises a fluid loss control additive, wherein said cationic polymer and said fluid loss control additive are present in said drilling fluid system at a second ratio of about 1:1.

62. The drilling fluid system of claim 48 wherein said brine further comprises a fluid loss control additive, wherein said cationic polymer and said fluid loss control additive are present in said drilling fluid system at a second ratio of about 1:1.

63. The drilling fluid system of claim 49 wherein said brine further comprises a fluid loss control additive, wherein said cationic polymer and said fluid loss control additive are present in said drilling fluid system at a second ratio of about 1:1.

64. The drilling fluid system of claim 50 wherein said brine further comprises a fluid loss control additive, wherein said cationic polymer and said fluid loss control additive are present in said drilling fluid system at a second ratio of about 1:1.

65. A drilling fluid system comprising a brine comprising an amount of at least one bridging agent and about 0.35 to about 3.5 lb/bbl of active cationic copolymer comprising a first ratio of cationic derivatives of acrylamide monomers to acrylamide monomers of from about 3:1 to about 1:1, said cationic derivatives of acrylamide monomers having the following general structure:

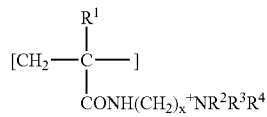

wherein
x is from about 1 to about 3;
$R^1$ is selected from the group consisting of hydrogen and alkyl groups having from about 1 to about 3 carbon atoms; and
$R^2$, $R^3$, and $R^4$ are selected from the group consisting of hydrogen; cyclic, linear, and branched alkyl and heteroalkyl groups having from about 1 to about 6 carbon atoms wherein said heteroalkyl groups comprise one or more heteroatoms selected from the group consisting of nitrogen and oxygen; cyclic, linear, and branched alkenyl and heteroalkenyl groups baying from about 1 to about 6 carbon atoms and resonance hybrids thereof; carboxylic acid groups and salts, esters, and amides thereof comprising cyclic, linear and branched alkyl groups, heteroalkyl groups, alkenyl groups, and heteroalkenyl groups having from about 1 to about 6 carbon atoms wherein said hetero groups comprise one or more heteroatoms selected from the group consisting of nitrogen and oxygen; aromatic groups; alkanols and alkenols having from about 1 to about 6 carbon atoms; alkanolamides and alkenol amides having from about 1 to about 6 carbon atoms; and combinations thereof.

66. The drilling fluid system of claim 65 wherein $R^2$, $R^3$, and $R^4$ are selected from the group consisting of hydrogen, cyclic, linear, and branched alkyl groups from about 1 to about 6 carbon atoms.

67. The drilling fluid system of claim 65 wherein $R^2$, $R^3$, and $R^4$ are linear alkyl groups from 1 about to about 6 carbon atoms.

68. The drilling fluid system of claim 65 wherein said first ratio is from about 3:1 to about 1:1.

69. The drilling fluid system of claim 66 wherein said first ratio is from about 3:1 to about 1:1.

70. The drilling fluid system of claim 67 wherein said first ratio is from about 3:1 to about 1:1.

71. The drilling fluid system of claim 65 wherein said brine comprises a density of about 9.0 lb/gal or greater.

72. The drilling fluid system of claim 66 wherein said brine comprises a density of about 9.0 lb/gal or greater.

73. The drilling fluid system of claim 67 wherein said brine comprises a density of about 9.0 lb/gal or greater.

74. The drilling fluid system of claim 68 wherein said brine comprises a density of about 9.0 lb/gal or greater.

75. The drilling fluid system of claim 69 wherein said brine comprises a density of about 9.0 lb/gal or greater.

76. The drilling fluid system of claim 70 wherein said brine comprises a density of about 9.0 lb/gal or greater.

77. The drilling fluid system of claim 65 wherein said brine further comprises a fluid loss control additive comprising 2-amino-2-methyl propane sulfonic acid.

78. The drilling fluid system of claim 66 wherein said brine further comprises a fluid loss control additive comprising 2-amino-2-methyl propane sulfonic acid.

79. The drilling fluid system of claim 67 wherein said brine further comprises a fluid loss control additive comprising 2-amino-2-methyl propane sulfonic acid.

80. The drilling fluid system of claim 68 wherein said brine further comprises a fluid loss control additive comprising 2-amino-2-methyl propane sulfonic acid.

81. The drilling fluid system of claim 69 wherein said brine further comprises a fluid loss control additive comprising 2-amino-2-methyl propane sulfonic acid.

82. The drilling fluid system of claim 70 wherein said brine further comprises a fluid loss control additive comprising 2-amino-2-methyl propane sulfonic acid.

83. The drilling fluid system of claim 71 wherein said brine further comprises a fluid loss control additive comprising 2-amino-2-methyl propane sulfonic acid.

84. The drilling fluid system of claim 72 wherein said brine further comprises a fluid loss control additive comprising 2-amino-2-methyl propane sulfonic acid.

85. The drilling fluid system of claim 73 wherein said brine further comprises a fluid loss control additive comprising 2-amino-2-methyl propane sulfonic acid.

86. The drilling fluid system of claim 76 wherein said brine further comprises a fluid loss control additive comprising 2-amino-2-methyl propane sulfonic acid.

87. The drilling fluid system of claim 65 wherein said brine further comprises a fluid loss control additive, wherein said cationic polymer and said fluid loss control additive are present in said drilling fluid system at a second ratio of from about 2:1 to about 1:2.

88. The drilling fluid system of claim 68 wherein said brine further comprises a fluid loss control additive, said cationic polymer and said fluid loss control additive are present in said drilling fluid system at a second ratio of from about 2:1 to about 1:2.

89. The drilling fluid system of claim 69 wherein said brine further comprises a fluid loss control additive, said cationic polymer and said fluid loss control additive are present in said drilling fluid system at a second ratio of from about 2:1 to about 1:2.

90. The drilling fluid system of claim 70 wherein said brine further comprises a fluid loss control additive, said cationic polymer and said fluid loss control additive are present in said drilling fluid system at a second ratio of from about 2:1 to about 1:2.

91. The drilling fluid system of claim 71 wherein said brine further comprises a fluid loss control additive, said cationic polymer and said fluid loss control additive are present in said drilling fluid system at a second ratio of from about 2:1 to about 1:2.

92. The drilling fluid system of claim 83 wherein said brine further comprises a fluid loss control additive, said cationic polymer and said fluid loss control additive are present in said drilling fluid system at a second ratio of from about 2:1 to about 1:2.

93. The drilling fluid system of claim 65 wherein said brine further comprises a fluid loss control additive, wherein said cationic polymer and said fluid loss control additive are present in said drilling fluid system at a second ratio of about 1:1.

94. The drilling fluid system of claim 68 wherein said brine further comprises a fluid loss control additive, said cationic polymer and said fluid loss control additive are present in said drilling fluid system at a second ratio of about 1:1.

95. The drilling fluid system of claim 69 wherein said brine further comprises a fluid loss control additive, said cationic polymer and said fluid loss control additive are present in said drilling fluid system at a second ratio of about 1:1.

96. The drilling fluid system of claim 70 wherein said brine further comprises a fluid loss control additive, said cationic polymer and said fluid loss control additive are present in said drilling fluid system at a second ratio of about 1:1.

97. The drilling fluid system of claim 71 wherein said brine further comprises a fluid loss control additive, said cationic polymer and said fluid loss control additive are present in said drilling fluid system at a second ratio of about 1:1.

98. The drilling fluid system of claim 83 wherein said brine further comprises a fluid loss control additive, said cationic polymer and said fluid loss control additive are present in said drilling fluid system at a second ratio of about 1:1.

99. The drilling fluid system of claim 65 wherein said brine has a density of from about 12 to about 17 lb/gal.

100. The drilling fluid system of claim 66 wherein said brine has a density of from about 12 to about 17 lb/gal.

101. The drilling fluid system of claim 67 wherein said brine has a density of from about 12 to about 17 lb/gal.

102. The drilling fluid system of claim 68 wherein said brine has a density of from about 12 to about 17 lb/gal.

103. The drilling fluid system of claim 77 wherein said brine has a density of from about 12 to about 17 lb/gal.

104. The drilling fluid system of claim 87 wherein said brine bas a density of from about 12 to about 17 lb/gal.

105. A method comprising adding to a drilling fluid system comprising a brine and an amount of at least one bridging agent, a quantity of cationic copolymers comprising a first ratio of acrylamide monomers to cationic derivatives of acrylamide monomers, said cationic derivatives of acrylamide monomers having the following general structure:

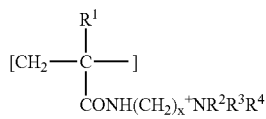

wherein x is from about 1 to about 3;

$R^1$ is selected from the group consisting of hydrogen and alkyl groups having from about 1 to about 3 carbon atoms; and $R^2$, $R^3$, and $R^4$ are selected from the group consisting of hydrogen; cyclic, linear, and branched alkyl and heteroalkyl groups having from about 1 to about 6 carbon atoms wherein said beteroalkyl groups comprise one or more heteroatoms selected from the group consisting of nitrogen and oxygen; cyclic, linear, and branched alkenyl and heteroalkenyl groups having from about 1 to about 6 carbon atoms and resonance hybrids thereof; carboxylic acid groups and salts, esters, and amides thereof comprising cyclic, linear and branched alkyl groups, heteroalkyl groups, alkenyl groups, and heteroalkenyl groups having from about 1 to about 6 carbon atoms wherein said hetero groups comprise one or more heteroatoms selected from the group consisting of nitrogen and oxygen; aromatic groups; alkanols and alkenols having from about 1 to about 6 carbon atoms; alkanolamides and alkenol amides having from about 1 to about 6 carbon atoms; and combinations thereof;

wherein said quantity of said cationic polymer and said amount of said bridging agent are effective to form a filter cake which provides effective filtration control and rheology in said drilling fluid system at temperatures of at least about 250° F. for at least about 16 hours.

106. The method of claim 105 wherein $R^2$, $R^3$, and $R^4$ are selected from the group consisting of hydrogen, cyclic, linear, and branched alkyl groups from about 1 to about 6 carbon atoms.

107. The method of claim 105 wherein $R^2$, $R^3$, and $R^4$ are linear alkyl groups from about 1 to about 6 carbon atoms.

108. The method of claim 105 wherein said brine comprises a density of about 9.0 lb/gal or greater.

109. The method of claim 106 wherein said brine comprises a density of about 9.0 lb/gal or greater.

110. The method of claim 107 wherein said brine comprises a density of about 9.0 lb/gal or greater.

111. The method of claim 105 wherein said amount of at least one bridging agent is about 50 lb/bbl.

112. The method of claim 106 wherein said amount of at least one bridging agent is about 50 lb/bbl.

113. The method of claim 107 wherein said amount of at least one bridging agent is about 50 lb/bbl.

114. The method of claim 105 wherein said first ratio is from about 3:1 to about 1:1.

115. The method of claim 106 wherein said first ratio is from about 3:1 to about 1:1.

116. The method of claim 107 wherein said first ratio is from about 3:1 to about 1:1.

117. The method of claim 105 wherein said first ratio is about 1:1.

118. The method of claim 106 wherein said first ratio is about 1:1.

119. The method of claim 107 wherein said first ratio is about 1:1.

120. The method of claim 105 wherein said brine further comprises a fluid loss control additive, wherein said cationic polymer and said fluid loss control additive are used in said drilling fluid system at a second ratio of from about 2:1 to about 1:2.

121. The method of claim 106 wherein said brine further comprises a fluid loss control additive, wherein said cationic polymer and said fluid loss control additive are used in said drilling fluid system at a second ratio of from about 2:1 to about 1:2.

122. The method of claim 107 wherein said brine further comprises a fluid loss control additive, wherein said cationic polymer and said fluid loss control additive are used in said drilling fluid system at a second ratio of from about 2:1 to about 1:2.

* * * * *

UNITED STATES PATENT AND TRADEMARK OFFICE
CERTIFICATE OF CORRECTION

PATENT NO. : 7,439,209 B2  Page 1 of 1
APPLICATION NO. : 10/136522
DATED : October 21, 2008
INVENTOR(S) : Billy G. Chesser, Charles Perricone and George W. Bettge It is certified that error appears in the above-identified patent and that said Letters Patent is hereby corrected as shown below:

Col. 6 Claim 1, line 27, "R4" is deleted and --$R^4$-- is inserted.

Col. 6 Claim 1, line 28, the "." is deleted after the word "alkyl".

Col. 8 Claim 32, line 11, after the word "claim," "1" is deleted and --2-- is inserted.

Signed and Sealed this

Sixteenth Day of December, 2008

JON W. DUDAS
*Director of the United States Patent and Trademark Office*